United States Patent
Kimura et al.

(10) Patent No.: US 10,202,982 B2
(45) Date of Patent: Feb. 12, 2019

(54) PRODUCTION METHODS OF GAS TURBINE (71) Applicant: Mitsubishi Hitachi Power Systems, Ltd., Nishi-ku, Yokohama (JP)

(72) Inventors: Yasunori Kimura, Yokohama (JP); Takanori Shibata, Yokohama (JP); Yasuo Takahashi, Yokohama (JP); Hironori Tsukidate, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 392 days.

(21) Appl. No.: 15/046,881

(22) Filed: Feb. 18, 2016

(65) Prior Publication Data

US 2016/0245305 A1    Aug. 25, 2016

(30) Foreign Application Priority Data

Feb. 19, 2015   (JP) ................................. 2015-030262

(51) Int. Cl.
    *F01D 5/14*            (2006.01)
    *F04D 29/52*         (2006.01)
    (Continued)

(52) U.S. Cl.
    CPC ........... *F04D 29/522* (2013.01); *F01D 5/143* (2013.01); *F02C 3/30* (2013.01); *F02C 7/1435* (2013.01);
    (Continued)

(58) Field of Classification Search
    CPC ............. F05D 2230/50; F05D 2230/60; F05B 2230/50; F05B 2230/60; B23P 15/008;
    (Continued)

(56) References Cited

U.S. PATENT DOCUMENTS 7,937,947 B2      5/2011    Kishibe et al.

FOREIGN PATENT DOCUMENTS

EP        1 528 240 A2     5/2005
JP          62-34119 U      2/1987
              (Continued)

OTHER PUBLICATIONS

Extended European Search Report issued in counterpart European Application No. 16156376.2 dated Jul. 12, 2016 (ten (10) pages).

*Primary Examiner* — Jason L Vaughan
*Assistant Examiner* — Amanda J Meneghini
(74) *Attorney, Agent, or Firm* — Crowell & Moring LLP (57) ABSTRACT

An object is to reduce the compressor flow rate in comparison with the reference model while maintaining a compression ratio equivalent to that in the reference model. Annulus areas required of a compressor 38 of a derivative gas turbine 200 are determined based on a compressor flow rate and a compression ratio required of the compressor 38 of the derivative gas turbine 200. Under the condition that the annulus area of each stage of the compressor 38 becomes equal to the determined annulus area, an inner radius increment and an outer radius decrement of an initial stage 36a are determined, the inner radius increment and the outer radius decrement of each of intermediate stages 36b-36e are determined so that the inner radius increment is not more than the inner radius increment of the previous stage and the outer radius decrement is not less than the outer radius decrement of the previous stage, and the inner radius increment and the outer radius decrement of a final stage 36f are determined so that the outer radius decrement is not less than the inner radius increment. The compressor 38 is designed by updating design data of components of the reference compressor 15 that deviated from the specifications due to the determination of the inner radius increment and the outer (Continued)

radius decrement so that the updated design data fulfill the specifications in each of the stages 36*a*-36*f*.

9 Claims, 7 Drawing Sheets

(51) Int. Cl.
*F02C 3/30* (2006.01)
*F02C 7/143* (2006.01)
*F04D 19/00* (2006.01)
*F04D 29/32* (2006.01)
*F04D 29/54* (2006.01)
*F04D 29/56* (2006.01)

(52) U.S. Cl.
CPC ............ *F04D 19/00* (2013.01); *F04D 29/321* (2013.01); *F04D 29/542* (2013.01); *F04D 29/563* (2013.01); *F05D 2220/32* (2013.01); *F05D 2230/50* (2013.01); *F05D 2230/51* (2013.01)

(58) Field of Classification Search
CPC .............. B23P 2700/01; B23P 2700/13; Y10T 29/4932; Y10T 29/49758
See application file for complete search history.

(56) References Cited

FOREIGN PATENT DOCUMENTS

| JP | 62-45397 U | 3/1987 |
|---|---|---|
| JP | 7-279889 A | 10/1995 |
| WO | WO 2006/119409 A2 | 11/2006 |
| WO | WO 2007/017498 A1 | 2/2007 |

PRODUCTION METHODS OF GAS TURBINE

BACKGROUND OF THE INVENTION

1. Field of the Invention

The present invention relates to design and production methods of a gas turbine.

2. Description of the Related Art

In recent years, new types of turbines such as humid air turbines injecting moisture into the intake air of the compressor and blast furnace gas firing gas turbines using low-calorie blast furnace gas as the fuel are emerging as derivative models of gas turbines. In cases where a derivative model is designed or produced based on a standard type of gas turbine that uses lamp oil, light oil, natural gas or the like as the fuel with no humidification of the intake air (reference model) at a low cost, it is desirable to reuse as many components of the reference model (i.e., divert as many components from the reference model) as possible and thereby reduce the number of components newly developed.

Meanwhile, if the compressor flow rate in a humid air turbine or a blast furnace gas firing gas turbine is made equal to that in the reference model, the turbine flow rate increases in comparison with the reference model. Specifically, since the humid air gas turbine supplies moisture to the downstream side of the compressor, the turbine flow rate increases correspondingly in comparison with the reference model. Also in the blast furnace gas firing gas turbine, due to the use of blast furnace gas as low-calorie fuel, a greater amount of fuel is necessary compared to cases where a common type of gas turbine fuel (natural gas, petroleum, etc.) is used, and consequently, the turbine flow rate increases correspondingly in comparison with the reference model. Therefore, in humid air turbines and blast furnace gas firing gas turbines, the turbine has to be newly designed and it is impossible to simply reuse components of the reference model.

To deal with this problem, there has been proposed a method that reduces the outer radius of the compressor channel to decrease the annulus area of the compressor channel, thereby reduces the compressor flow rate, and thereby makes the turbine flow rate equivalent to that in the reference model (see U.S. Pat. No. 7,937,947, for example).

SUMMARY OF THE INVENTION

In the method described in U.S. Pat. No. 7,937,947, the length of each rotor blade in the blade length direction decreases corresponding to the decrease in the outer radius of the compressor channel. Thus, the circumferential velocity of each rotor blade decreases and the compression ratio (pressure ratio) can drop compared to that in the reference model.

The object of the present invention, which has been made in consideration of the above-described situation, is to provide design and production methods of a gas turbine capable of reducing the compressor flow rate in comparison with the reference model while maintaining a compression ratio equivalent to that in the reference model.

To achieve the above object, the present invention provides a gas turbine production method for producing a derivative gas turbine of a different cycle based on a reference gas turbine including a reference compressor. Letting a reference inner radius and a reference outer radius respectively represent an inner radius and an outer radius of an annular compressor channel of the reference compressor, an inner radius increment represent an increment in an inner radius of a compressor channel of the derivative gas turbine with respect to the reference inner radius, and an outer radius decrement represent a decrement in an outer radius of the compressor channel of the derivative gas turbine with respect to the reference outer radius, the gas turbine production method includes the steps of: determining a compressor flow rate and a compression ratio required of a compressor of the derivative gas turbine; determining annulus areas required of the compressor of the derivative gas turbine based on the determined compressor flow rate and compression ratio; determining the inner radius increment and the outer radius decrement of an initial stage, determining the inner radius increment and the outer radius decrement of each of intermediate stages on the downstream side of the initial stage so that the inner radius increment is not more than the inner radius increment of the previous stage and the outer radius decrement is not less than the outer radius decrement of the previous stage, and determining the inner radius increment and the outer radius decrement of a final stage on the downstream side of the intermediate stages so that the outer radius decrement is not less than the inner radius increment under a condition that the annulus area of each stage of the compressor of the derivative gas turbine becomes equal to the determined annulus area; designing the compressor of the derivative gas turbine by updating design data of components of the reference compressor that deviated from specifications due to the determination of the inner radius increment and the outer radius decrement so that the updated design data fulfill the specifications in the initial stage, in each of the intermediate stages, and in the final stage; and producing the compressor of the derivative gas turbine based on the design and thereby producing the derivative gas turbine.

According to the present invention, it is possible to provide design and production methods of a gas turbine capable of reducing the compressor flow rate in comparison with the reference model while maintaining a compression ratio equivalent to that in the reference model.

DESCRIPTION OF THE PREFERRED EMBODIMENTS

First Embodiment
Configuration
1. Reference Model

First, a reference model (reference gas turbine) will be explained below. The reference model in this embodiment is a model (gas turbine) that has past records of design or production and has been selected as will be explained later.

Figure 1:
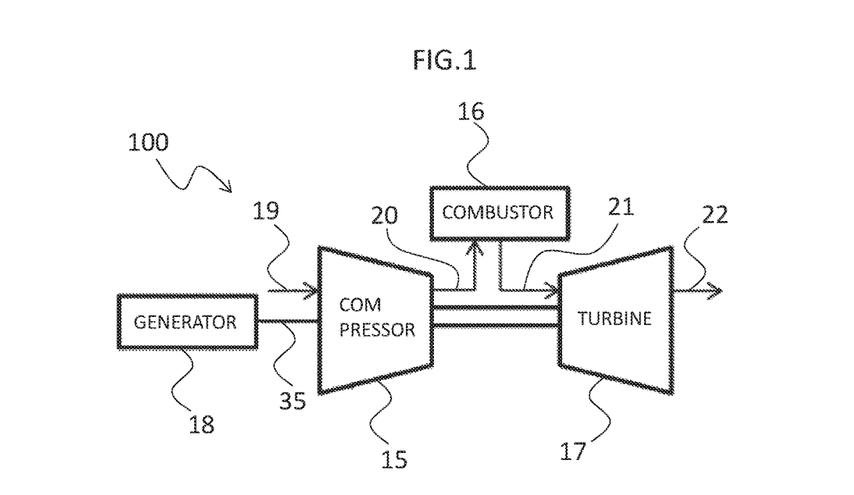
FIG. 1 is a schematic diagram of a reference model according to a first embodiment of the present invention.

FIG. 1 is a schematic diagram of the reference model. As shown in FIG. 1, the reference model 100 includes a compressor (reference compressor) 15, a combustor 16, and a turbine 17.

The reference compressor 15 generates high-pressure compressed air 20 by compressing air 19 taken in via an air intake part (unshown) and supplies the compressed air 20 to the combustor 16. The combustor 16 causes combustion by mixing fuel with the compressed air 20 obtained from the reference compressor 15, thereby generates high-temperature combustion gas 21, and supplies the high-temperature combustion gas 21 to the turbine 17. The turbine 17 is driven by the expansion of the combustion gas 21 obtained from the combustor 16. The reference compressor 15 is driven by power obtained by the turbine 17, while a generator 18 is driven by remaining power and generates electric power. The combustion gas 21 after driving the turbine 17 is discharged from the turbine 17 as exhaust gas 22. In this embodiment, the reference compressor 15, the turbine 17 and the generator 18 are interlinked by a shaft 35.

2. Derivative Model

A derivative model (derivative gas turbine) will be explained below by taking a humid air gas turbine as an example.

Figure 2:
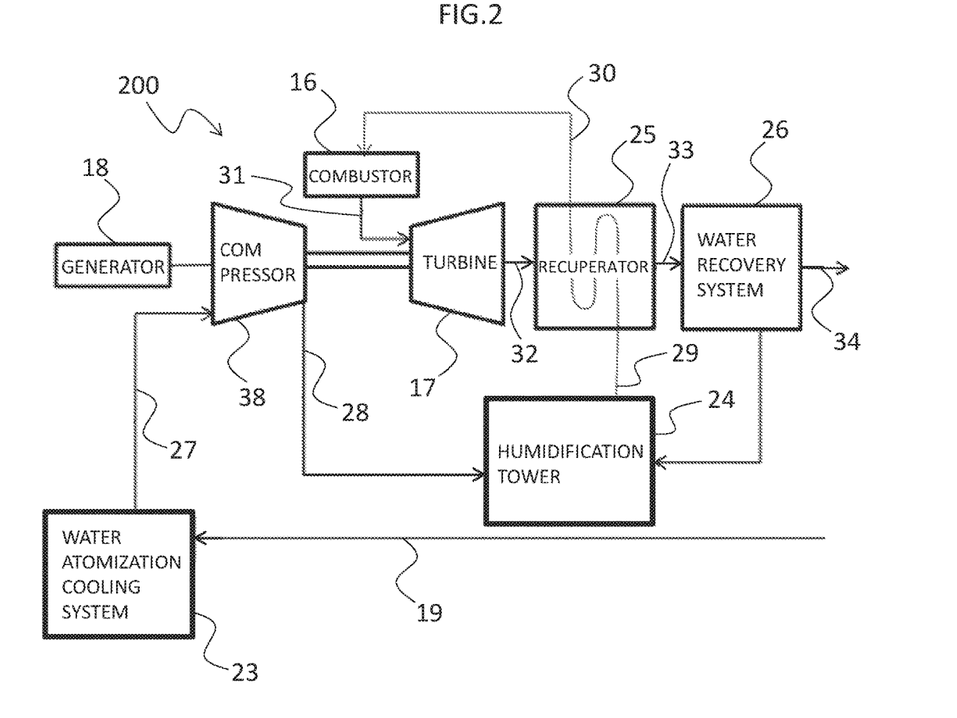
FIG. 2 is a schematic diagram of a humid air gas turbine according to the first embodiment of the present invention.

FIG. 2 is a schematic diagram of a humid air gas turbine. Parts in FIG. 2 equivalent to those of the reference model 100 shown in FIG. 1 are assigned the same reference characters as in FIG. 1 and repeated explanation thereof is omitted properly. As shown in FIG. 2, the humid air gas turbine 200 includes a water atomization cooling system 23, a humidification tower 24, a recuperator 25, and a water recovery system 26 in addition to the components of the reference model 100.

The water atomization cooling system 23 generates humid air 27 by spraying water into the air 19 taken in via the air intake part and supplies the humid air 27 to a compressor 38. The compressor 38 generates compressed air 28 by compressing the humid air 27 into which water has been sprayed by the water atomization cooling system 23. The entire flow of the compressed air 28 generated by the compressor 38 is extracted through a gas path outlet of the compressor 38 and is supplied to the humidification tower 24.

The humidification tower 24 generates humid air 29 by humidifying the compressed air 28 obtained from the compressor 38 and supplies the humid air 29 to the recuperator 25.

The recuperator 25 heats up the humid air 29 humidified by the humidification tower 24 by means of heat exchange with exhaust gas 32 supplied from the turbine 17 and supplies the heated humid air to the combustor 16.

The combustor 16 causes combustion by mixing fuel with the humid air 30 heated by the recuperator 25, thereby generates high-temperature combustion gas 31, and supplies the high-temperature combustion gas 31 to the turbine 17. The turbine 17 is driven by the expansion of the combustion gas 31 obtained from the combustor 16. The combustion gas 31 after driving the turbine 17 is supplied to the recuperator 25 as the exhaust gas 32. The exhaust gas 32 supplied to the recuperator 25 undergoes heat recovery by means of heat exchange with the exhaust gas 29 and is supplied to the water recovery system 26 as exhaust gas 33.

The water recovery system 26 recovers water by cooling down the exhaust gas 33 which has passed through the recuperator 25 and condensing moisture in the cooled exhaust gas 33. The water recovered by the water recovery system 26 is supplied to the humidification tower 24. The exhaust gas 33 after undergoing the water recovery by the water recovery system 26 is discharged from the water recovery system 26 as exhaust gas 34.

The humid air gas turbine 200 is capable of recovering thermal energy of the exhaust gas 32 by use of the recuperator 25 in order to heat up the humid air 29. Therefore, assuming that the flow rate of the humid air 27 supplied to the compressor 38 (compressor flow rate) is equivalent to that in the reference model 100, the humid air gas turbine 200 is capable of reducing the flow rate of the fuel supplied to the combustor 16 in comparison with the reference model 100 and thereby increasing the efficiency of the gas turbine cycle. Further, the humid air gas turbine 200 is capable of increasing the turbine flow rate and the turbine output power by adding moisture to the compressed air 28 in the humidification tower 24. Furthermore, the humid air gas turbine 200 is capable of increasing the efficiency of the gas turbine cycle since the amount of thermal energy recovered by the recuperator 25 can be increased by increasing the flow rate of the humid air 29 while lowering its temperature through the addition of moisture to the compressed air 28 in the humidification tower 24.

3. Production of Derivative Model

In the humid air gas turbine 200, the turbine flow rate increases compared to that in the reference model 100, and thus the turbine has to be newly designed and it is impossible to simply reuse the turbine 17 of the reference model 100. In this embodiment, the humid air gas turbine 200 is designed/produced by designing/producing the compressor 38 based on the reference compressor 15 so that the compressor flow rate of the compressor 38 decreases from that of the reference compressor 15 by the increment in the turbine flow rate, while implementing the other components by reusing those of the reference model 100.

3-1. Reference Compressor

Figure 3:
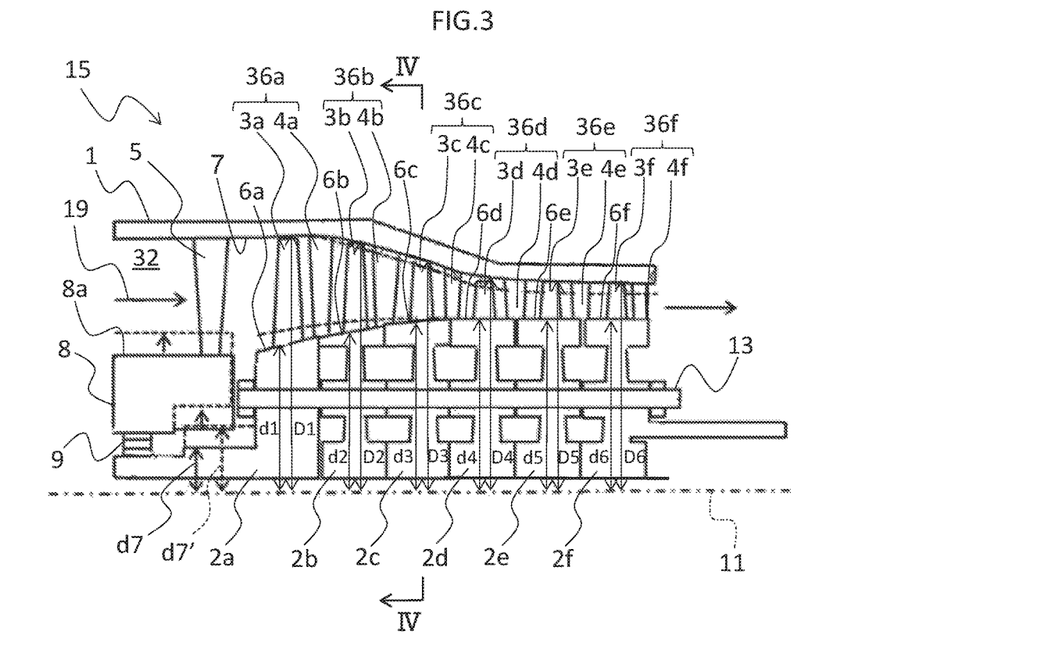
FIG. 3 is a schematic diagram showing the overall configuration of a configuration example of a reference compressor according to the first embodiment of the present invention.
Figure 4:
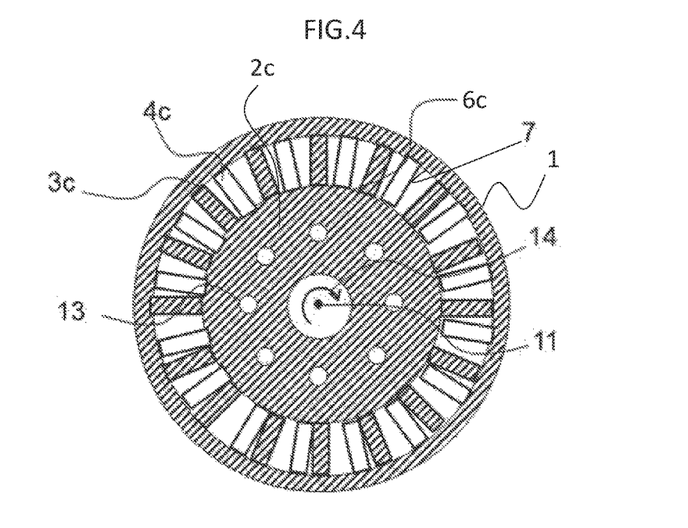
FIG. 4 is a cross-sectional view taken in the arrow direction of the line IV-IV in FIG. 3.

FIG. 3 is a schematic diagram showing the overall configuration of a configuration example of the reference compressor. FIG. 4 is a cross-sectional view taken in the arrow direction of the line IV-IV in FIG. 3.

As shown in FIG. 3, the reference compressor 15 includes a casing 1, disks 2a-2f, rotor blades 3a-3f, and stator blades 4a-4f.

The casing 1 is a cylindrical member forming a peripheral wall of the reference compressor 15. The disks 2a-2f, the rotor blades 3a-3f and the stator blades 4a-4f are accommodated in the casing 1.

The disks 2a-2f are arranged as a stack in the flow direction of the air 19 and fastened integrally by using tie bolts 13. The disks 2a-2f, together with the rotor blades 3a-3f, constitute a rotor. As shown in FIG. 4, eight tie bolts 13 are arranged at even intervals on one circumference centering at the central axis 11 of the reference compressor 15. Incidentally, while a reference compressor having six disks 2a-2f is shown in FIG. 3 as an example, a compressor having seven disks or more or five disks or less can also be employed as the reference compressor. Further, the number of the tie bolts can also be more than or less than eight.

An annular compressor channel 32 is formed between the casing 1 and the disks 2a-2f. An outer circumferential wall of the compressor channel 32 is formed by an inner circumferential surface 7 of the casing 1. An inner circumferential wall of the compressor channel 32 is formed by an outer circumferential surface 8a of an inner circumferential member 8 (explained later) and outer circumferential surfaces 6a-6f of the disks 2a-2f. The air 19 taken into the reference compressor 15 is compressed in the process of flowing through the compressor channel 32. The compression process of the air 19 will be explained later.

As shown in FIGS. 3 and 4, a plurality of vanes of each rotor blade 3a-3f are arranged on the outer circumferential surface (6a-6f) of each disk 2a-2f at even intervals in the circumferential direction of the rotor. The rotor blades 3a-3f extend from the outer circumferential surfaces 6a-6f of the disks 2a-2f toward the outer circumferential side of the reference compressor 15 (i.e., the inner circumferential surface 7 of the casing 1). The rotor blades 3a-3f rotate around the central axis 11 clockwise as viewed from the downstream side (in the direction of the arrow 14 in FIG. 4) together with the disks 2a-2f due to the air 19 flowing downstream through the compressor channel 32.

A plurality of vanes of each stator blade 4a-4f are arranged on the inner circumferential surface 7 of the casing 1 at even intervals in the circumferential direction of the rotor. The stator blades 4a-4f extend from the inner circumferential surface 7 of the casing 1 toward the inner circumferential side of the reference compressor 15 (i.e., the outer circumferential surfaces 6a-6f of the disks 2a-2f).

As shown in FIG. 3, the rotor blades 3a-3f and the stator blades 4a-4f are arranged alternately in the flow direction of the air 19. Specifically, the rotor blades and the stator blades are arranged alternately so that the rotor blade 3a, the stator blade 4a, the rotor blade 3b, the stator blade 4b, etc. are situated in this order from the inlet of the compressor channel 32 toward the downstream side. A pair of rotor blade and stator blade adjoining in the flow direction of the air 19 from the inlet of the compressor channel 32 constitutes a blade stage. In the configuration illustrated in FIG. 3, the rotor blade 3a and the stator blade 4a constitute a first blade stage 36a, the rotor blade 3b and the stator blade 4b, the rotor blade 3c and the stator blade 4c, the rotor blade 3d and the stator blade 4d, and the rotor blade 3e and the stator blade 4e respectively constitute second through fifth blade stages 36b-36e, and the rotor blade 3f and the stator blade 4f constitute a sixth blade stage 36f. In the following description, the first blade stage 36a may also be referred to as an initial stage, the second through fifth blade stages 36b-36e on the downstream side of the initial stage may also be referred to as intermediate stages, and the sixth blade stage 36f on the downstream side of the intermediate stages may also be referred to as a final stage.

At a position on the upstream side of the rotor blade 3a, the disk 2a is supported by the inner circumferential member 8 via a shaft bearing 9.

On the upstream side of the rotor blade 3a of the initial stage 36a, a plurality of inlet guide vanes 5 are arranged at even intervals in the circumferential direction of the rotor. The inlet guide vanes 5 extend from the outer circumferential surface 8a of the inner circumferential member 8 toward the inner circumferential surface 7 of the casing 1.

Figure 5:
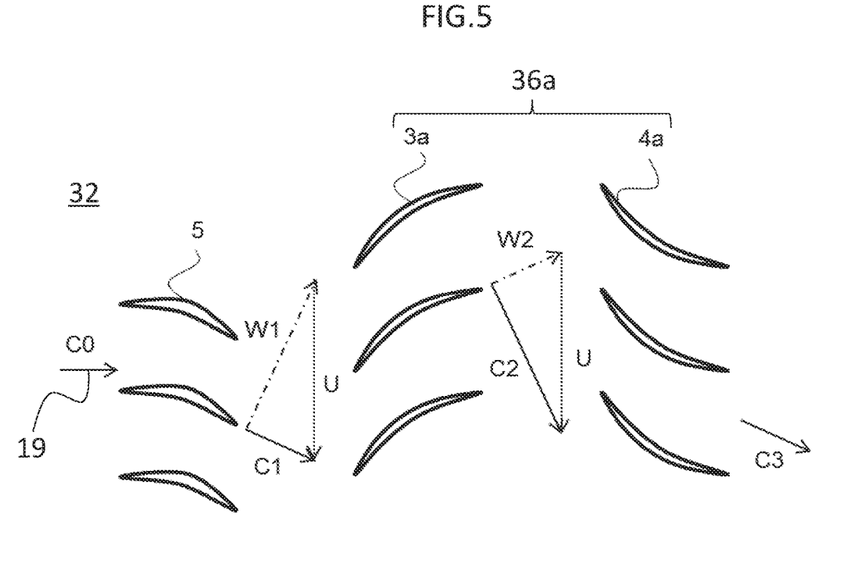
FIG. 5 is a schematic diagram illustrating the flow of air flowing downstream through a compressor channel.

The compression process of the air 19 flowing downstream through the compressor channel 32 will be explained below.

FIG. 5 is a schematic diagram illustrating the flow of the air 19 flowing downstream through the compressor channel 32. FIG. 5 shows a part from the inlet guide vanes 5 to the first blade stage 36a constituted of the rotor blade 3a and the stator blade 4a. In FIG. 5, the inlet guide vanes 5 and the stator blade 4a are stationary with respect to the compressor channel 32, while the rotor blade 3a is rotating with respect to the compressor channel 32 around the central axis 11 (see FIGS. 3 and 4) in the rotational direction indicated by the vector U.

The air 19 flowing into the inlet guide vanes 5 in the direction indicated by the vector C0 turns into the direction indicated by the vector C1 along the shape of the inlet guide vanes 5 and then flows out from the inlet guide vanes 5.

The air 19 flowing out from the inlet guide vanes 5 in the direction indicated by the vector C1 flows into the rotor blade 3a situated on the downstream side. Since the rotor blade 3a is rotating in the direction indicated by the vector U, the air 19 traveling in the direction indicated by the vector C1 appears to be traveling in the direction indicated by the vector W1 as viewed from the rotor blade 3a. The air 19 flowing into the rotor blade 3a apparently in the direction indicated by the vector W1 turns into the direction indicated by the vector W2 and then flows out from the rotor blade 3a. In this case, the air 19 is decelerated from the velocity at the time of flowing into the rotor blade 3a and then flows out from the rotor blade 3a in a compressed state. When the flow of the air 19 from the upstream side of the rotor blade 3a to the downstream side of the rotor blade 3a is viewed in the static system, the air 19 flowing into the rotor blade 3a in the direction indicated by the vector C1 is provided with a swirl component, turns into the direction indicated by the vector C2, and flows out from the rotor blade 3a.

In the air 19 which flowed out from the rotor blade 3a in the direction indicated by the vector C2, the swirl component provided by the rotor blade 3a is suppressed by the stator blade 4a situated on the downstream side. Accordingly, the air 19 turns into the direction indicated by the vector C3 along the shape of the stator blade 4a and then flows out from the stator blade 4a. In this case, the air 19 is decelerated from the velocity at the time of flowing into the stator blade 4a and then flows out from the stator blade 4a in a more compressed state. Thereafter, the air 19 is successively compressed by repetition of the provision of the swirl component by a rotor blade and the deprivation of the swirl component by a stator blade.

3-2. Design/Production of Compressor

Figure 6:
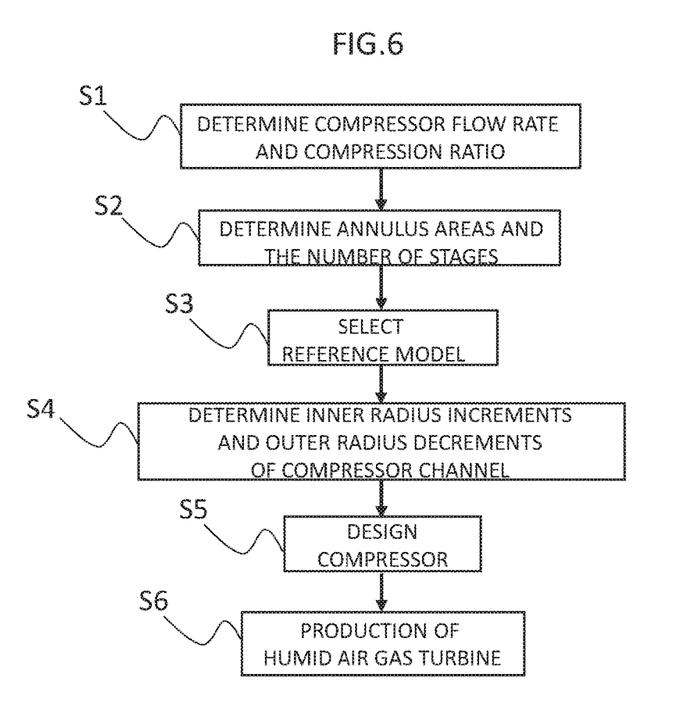
FIG. 6 is a flow chart showing a design/production procedure of a compressor according to the first embodiment of the present invention.

FIG. 6 is a flow chart showing a design/production procedure of the compressor 38. The design/production procedure of the compressor 38 will be described below.

Step S1

The compressor flow rate and the compression ratio required of the compressor 38 are determined based on the specifications of the humid air gas turbine 200.

Step S2

The annulus area of each stage from the initial stage to the final stage and the number of stages required of the compressor 38 are determined based on the compressor flow rate and the compression ratio determined in the step S1. A method for determining the annulus area of each stage of the compressor 38 will be explained below.

In a compressor, a relationship indicated by the following expression (1) generally holds among the annulus area A, the compression flow rate m, the density ρ of the fluid, and the axial velocity C of the fluid:

$$m = \rho C A \quad (1)$$

In cases where the air bleeding (air extraction) or the like is not performed on the compressor, the compression flow rate m becomes equal among all the blade stages. The axial velocity C is also assumed to be constant in all the blade stages in many cases. Therefore, the annulus area A of each stage is determined according to the density ρ of the fluid to satisfy the expression (1). Since the fluid is compressed in the process of flowing downstream through the compressor channel as mentioned above, the density ρ gradually increases and the annulus area A gradually decreases as it goes toward the downstream side.

Assuming that internal flow conditions of the compressor 38 (i.e., conditions such as the inflow direction of the air 19 in FIG. 5 and the revolution speed of the rotor blade 3a) are equivalent to those of the reference compressor 15, the density ρ and the axial velocity C in the expression (1) become equal between the reference compressor 15 and the compressor 38, and thus the compression flow rate m and the annulus area A of the reference compressor 15 and the compression flow rate m and the annulus area A of the compressor 38 satisfy proportionality relation. Therefore, it is sufficient if the annulus area of the compressor 38 is determined so that the decrease ratio of the annulus area of the compressor 38 with respect to the reference compressor 15 becomes equivalent to the decrease ratio of the compressor flow rate of the compressor 38 with respect to the reference compressor 15.

Step S3

Subsequently, the reference model 100 is selected based on the annulus areas and the number of stages determined in the step S2. For example, a model including a reference compressor having annulus areas not less than the annulus areas determined in the step S2 and having a certain number of stages close to the number of stages determined in the step S2 may be selected as the reference model 100. As to the annulus areas in the reference model 100, it is desirable that the annulus area in each stage be not less than the value (annulus area) determined in the step S2 and the difference from the annulus area determined in the step S2 be as small as possible, for example. This is because there are contraction margins of the annulus areas and high commonality with the compressor 38 can be expected.

Step S4

Subsequently, inner radius increments and outer radius decrements of the compressor channel 32 of the compressor 38 with respect to the reference compressor 15 of the reference model 100 selected in the step S3 are determined so that the annulus areas of the compressor 38 become equal to the annulus areas determined in the step S2.

A method for decreasing the annulus areas of the reference compressor 15 will be explained below.

In this embodiment, the outer radii of the compressor channel 32 are decreased while increasing the inner radii of the compressor channel 32 as shown in FIG. 3. In the following explanation, the inner radii d1-d6 and the outer radii D1-D6 of the compressor channel 32 of the reference compressor 15 will be referred to as reference inner radii and reference outer radii, respectively. Increments in the inner radii of the compressor channel of the compressor 38 with respect to the reference inner radii d1-d6 will be referred to as the inner radius increments. Decrements in the outer radii of the compressor channel of the compressor 38 with respect to the reference outer radii D1-D6 will be referred to as the outer radius decrements.

In this embodiment, under the condition that the annulus area of each stage of the compressor 38 becomes equal to the annulus area determined in the step S2, the inner radius increments and the outer radius decrements of the initial stage 36a, the intermediate stages 36b-36e and the final stage 36f are determined so as to satisfy the following relationships:

Initial Stage

In the initial stage 36a, the determination is made so that the inner radius increment is greater than the outer radius decrement.

Intermediate Stages

In each of the intermediate stages 36b-36e, the determination is made so that the inner radius increment is not more than the inner radius increment of the previous stage and the outer radius decrement is not less than the outer radius decrement of the previous stage. For example, in the third blade stage 36c, the determination is made so that the inner radius increment is not more than the inner radius increment of the second blade stage 36b as the previous stage and the outer radius decrement is not less than the outer radius decrement of the second blade stage 36b as the previous stage.

Final Stage

In the final stage 36f, the determination is made so that the outer radius decrement is not less than the inner radius increment.

Step S5

The compressor 38 is designed by updating components in the initial stage 36a, the intermediate stages 36b-36e and the final stage 36f of the reference compressor 15 (the casing 1, the disks 2a-2f, the rotor blades 3a-3f, the stator blades 4a-4f, etc.) that deviated from the specifications due to the inner radius increment and the outer radius decrement determined in the step S4 so that the updated components fulfill the specifications, while reusing components that are common in regard to the specifications. In this embodiment, the specifications are requirements that the components should fulfill.

Step S6

The compressor 38 is produced according to the design in the step S5.

Incidentally, the humid air gas turbine 200 is produced by using the compressor 38 produced in the step S6.

Effect (1) Reduction in Compressor Flow Rate

In this embodiment, the annulus areas required of the compressor 38 are determined from the specifications of the humid air gas turbine 200, and the inner radius increments and the outer radius decrements of the compressor channel 32 of the compressor 38 with respect to the reference compressor 15 are determined so that the annulus areas of the compressor 38 become equal to the determined annulus areas. Therefore, the compressor flow rate of the compressor 38 can be reduced with respect to the reference compressor 15 by the increment in the turbine flow rate.

(2) Maintaining of Compressor Efficiency

Besides the above-described method, there are methods called "tip cut" and "hub up" for decreasing the annulus areas of the reference compressor 15.

Figure 7:
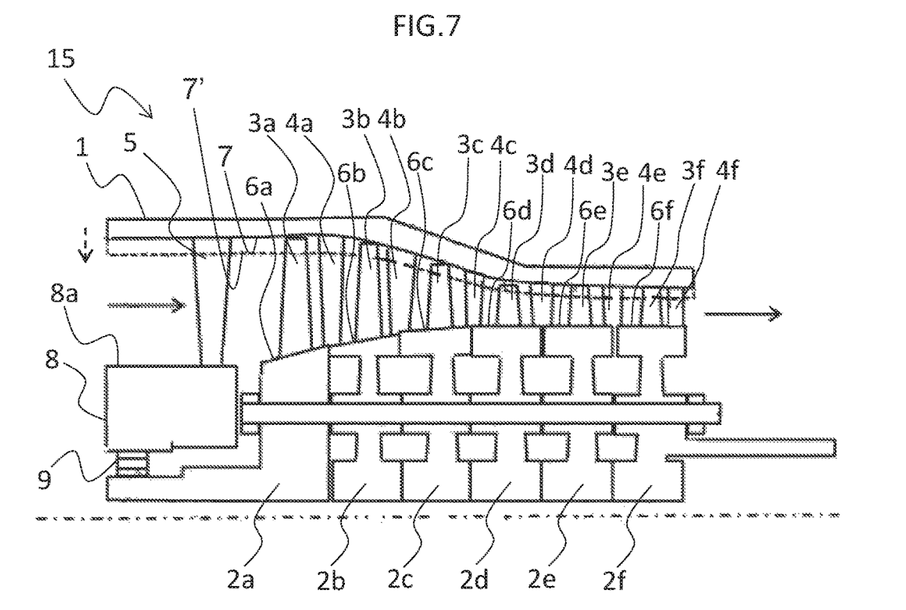
FIG. 7 is a schematic diagram for explaining tip cut.

FIG. 7 is a schematic diagram for explaining the tip cut. Parts in FIG. 7 equivalent to those in the reference compressor 15 in the first embodiment are assigned the already used reference characters and repeated explanation thereof is omitted properly.

As shown in FIG. 7, the tip cut is a method that just decreases the outer radii of the compressor channel 32 of the reference compressor 15 (i.e., changes the inner circumferential surface 7 to the inner circumferential surface 7') without increasing the inner radii of the compressor channel 32.

Figure 8:
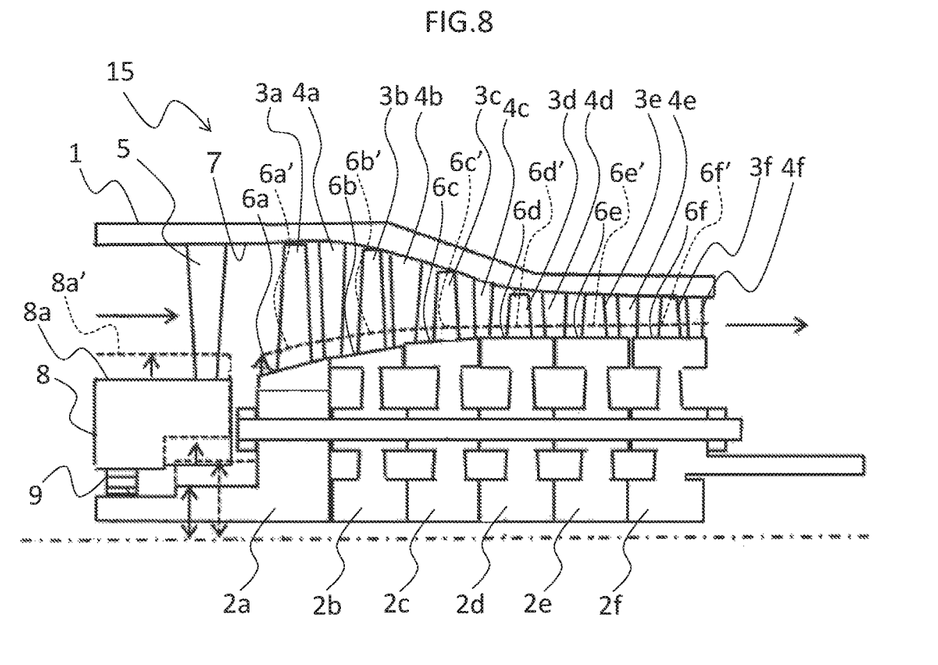
FIG. 8 is a schematic diagram for explaining hub up.

FIG. 8 is a schematic diagram for explaining the hub up. Parts in FIG. 8 equivalent to those in the reference compressor 15 in the first embodiment are assigned the already used reference characters and repeated explanation thereof is omitted properly.

As shown in FIG. 8, the hub up is a method that just increases the inner radii of the compressor channel 32 of the reference compressor 15 (i.e., changes the outer circumferential surfaces 6a-6f and 8a to the outer circumferential surfaces 6a'-6f' and 8a') without decreasing the outer radii of the compressor channel 32.

The compressor efficiency is mainly determined by the stage load and the blade height (blade length) of each blade stage. The compressor efficiency increases with the decrease in the stage load and with the increase in the blade height.

Compressor Efficiency and Stage Load

A stage loading factor $\psi$ is defined as an index of the load in any given blade stage of the compressor. The compressor efficiency increases with the decrease in the stage loading factor $\psi$ and decreases with the increase in the stage loading factor $\psi$. The stage loading factor $\psi$ can be represented as the following expression (2) by using an enthalpy increment $\Delta h$ in any given blade stage and a circumferential velocity u at the average radius of the rotor blades:

$$\psi = h/u^2 \quad (2)$$

Figure 9:
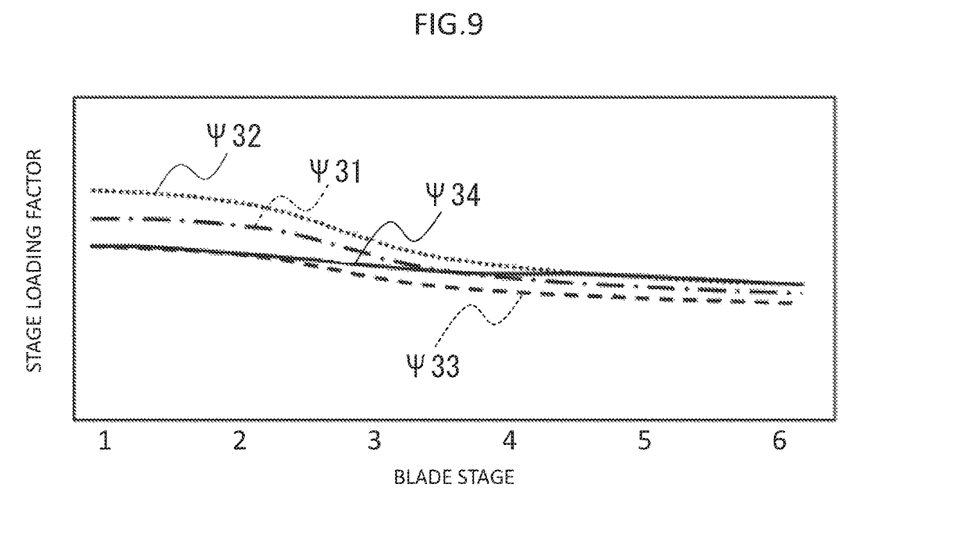
FIG. 9 is a diagram illustrating the relationship between a stage loading factor and blade stages.

FIG. 9 is a diagram illustrating the relationship between the stage loading factor and the blade stages. The vertical axis represents the stage loading factor $\psi$ and the horizontal axis represents the blade stages. Each number on the horizontal axis corresponds to the stage number of each blade stage with reference to the initial stage. Specifically, the number 1 corresponds to the initial stage, the numbers 2-5 correspond to the intermediate stages, and the number 6 corresponds to the final stage (see FIG. 3). In FIG. 9, the chain line represents the stage loading factor $\psi$31 of the reference compressor 15, the dotted line represents the stage loading factor $\psi$32 of the compressor after the tip cut, the broken line represents the stage loading factor $\psi$33 of the compressor after the hub up, and the solid line represents the stage loading factor $\psi$34 of the compressor 38.

As shown in FIG. 9, the stage loading factor $\psi$33 of the compressor after the hub up becomes smaller than the stage loading factor $\psi$31 of the reference compressor 15 throughout all stages from the initial stage to the final stage. Therefore, the compressor efficiency of the compressor after the hub up becomes higher than that of the reference compressor 15. The reason why the stage loading factor $\psi$33 of the compressor after the hub up becomes smaller than the stage loading factor $\psi$31 of the reference compressor 15 is that the hub up increases the average radius of the rotor blades and thereby increases the circumferential velocity u. In this embodiment, the average radius of the blades is the distance from the central axis 11 to a central part of the blades. In contrast, the stage loading factor $\psi$32 after the tip cut becomes larger than the stage loading factor $\psi$31 of the reference compressor 15 throughout all stages from the initial stage to the final stage. Therefore, the compressor efficiency of the compressor after the tip cut becomes lower than that of the reference compressor 15. The reason why the stage loading factor $\psi$32 after the tip cut becomes larger than the stage loading factor $\psi$31 of the reference compressor 15 is that the tip cut decreases the average radius of the rotor blades and thereby decreases the circumferential velocity u. The superiority of the hub up to the tip cut in regard to the change in the stage loading factor $\psi$ becomes increasingly remarkable as it goes toward the initial stage. This is because the stage loading factor $\psi$ changes greatly as it goes toward the initial stage since the blade height increases and the change in the average radius increases as it goes toward the initial stage.

Compressor Efficiency and Blade Height

In general, with the increase in the blade height, the flow rate of part of the air 19 in the compressor channel 32 that causes friction against the outer circumferential surfaces 6a-6f and the inner circumferential surface 7 decreases, and consequently, the fluid loss decreases. In contrast, decreasing the annulus area leads to a decrease in the blade height, and thus the flow rate of part of the air 19 in the compressor channel 32 that causes friction against the outer circumferential surfaces 6a-6f and the inner circumferential surface 7 increases, and consequently, the fluid loss caused by the outer circumferential surfaces 6a-6f and the inner circumferential surface 7 increases. Further, vortices develop in the compressor channel 32 due to the friction occurring between the air 19 and the outer circumferential surfaces 6a-6f and the inner circumferential surface 7, and the vortices interfere with the air 19. Consequently, the compressor efficiency decreases.

Figure 10:
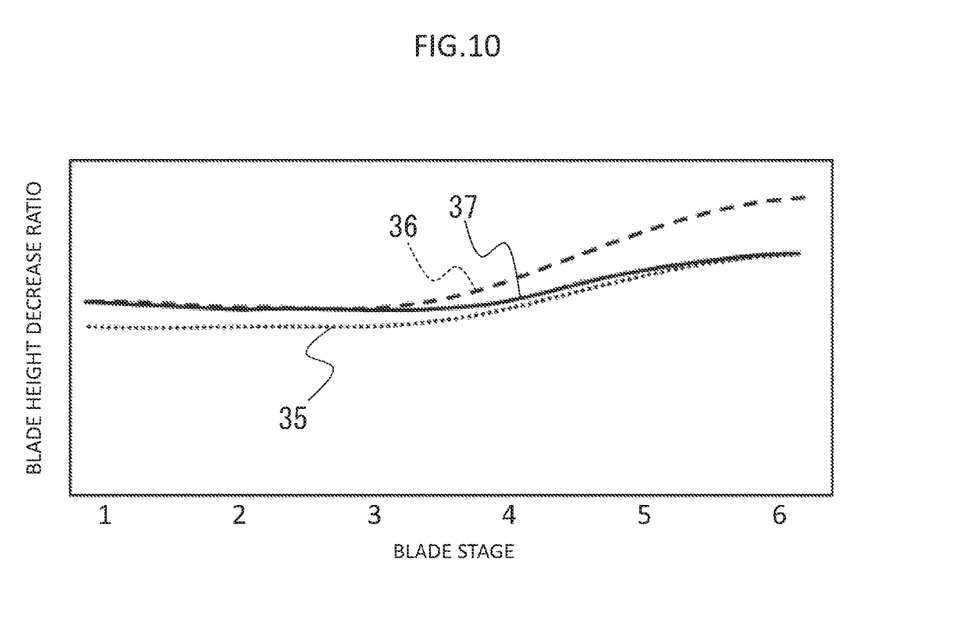
FIG. 10 is a diagram illustrating the relationship between a blade height decrease ratio and the blade stages.

FIG. 10 is a diagram illustrating the relationship between a blade height decrease ratio and the blade stages. The vertical axis represents the blade height decrease ratio and the horizontal axis represents the blade stages. The numbers on the horizontal axis are the same as those in FIG. 9. In FIG. 10, the dotted line represents the blade height decrease ratio 35 of the compressor after the tip cut, the broken line represents the blade height decrease ratio 36 of the compressor after the hub up, and the solid line represents the blade height decrease ratio 37 of the compressor 38. In this embodiment, the blade height decrease ratio, in the case of the compressor 38, for example, is represented by a value obtained by dividing the blade height difference (in any given stage) between the reference compressor 15 and the compressor 38 by the blade height in the reference compressor 15. The compressor efficiency decreases with the increase in the blade height decrease ratio.

As shown in FIG. 10, the blade height decrease ratio 35 of the compressor after the tip cut becomes smaller than the blade height decrease ratio 36 after the hub up throughout all stages from the initial stage to the final stage. Therefore, the hub up is capable of restraining the deterioration in the compressor efficiency with respect to the reference compressor 15 better than the tip cut. Further, the difference between the blade height decrease ratio 36 after the hub up and the blade height decrease ratio 35 after the tip cut increases as it goes toward rear stages where the blade height is originally small. Thus, the hub up is capable of better restraining the deterioration in the compressor efficiency than the tip cut more remarkably on the rear stages side.

In this embodiment, the outer radii are decreased in the rear stages while increasing the inner radii in the front stages by making the determination in the initial stage so that the inner radius increment is greater than the outer radius decrement, making the determination in each of the intermediate stages so that the inner radius increment is not more than the inner radius increment of the previous stage and the outer radius decrement is not less than the outer radius decrement of the previous stage, and making the determination in the final stage so that the outer radius decrement is not less than the inner radius increment. Therefore, as shown in FIGS. 9 and 10, in the front stages, the stage loading factor ψ34 can be made small and the blade height decrease ratio 37 can be made smaller than in the rear stages similarly to the case of the hub up. Thus, a compressor efficiency improvement effect that is achieved by making the stage loading factor ψ34 small becomes dominant in the front stages. In the rear stages, the blade height decrease ratio 37 can be made small and the stage loading factor ψ34 can be made smaller than in the front stages similarly to the case of the tip cut. Thus, a compressor efficiency improvement effect that is achieved by making the blade height decrease ratio small becomes dominant in the rear stages.

Figure 11:
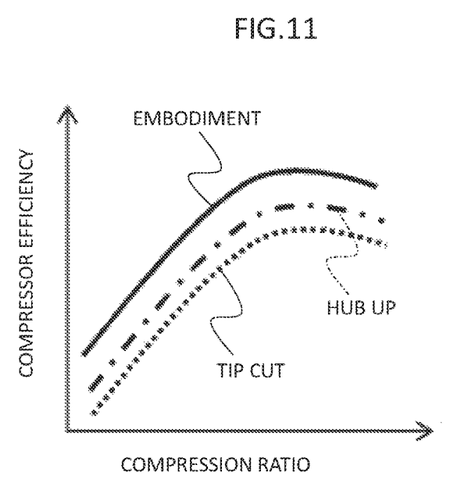
FIG. 11 is a diagram illustrating compression ratio dependence of compressor efficiency.

FIG. 11 is a diagram illustrating the compression ratio dependence of the compressor efficiency. The vertical axis represents the compressor efficiency and the horizontal axis represents the compression ratio. In FIG. 11, the dotted line represents the case of the tip cut, the broken line represents the case of the hub up, and the solid line represents the case of this embodiment.

In general, the compressor efficiency is designed so as to hit the maximum at a compression ratio at the design point. Since this embodiment employs a configuration advantageous in terms of the compressor efficiency both in the front stages and in the rear stages as mentioned above, this embodiment is capable of maintaining higher compressor efficiency in the entire compressor compared to the configurations simply employing the tip cut or the hub up as shown in FIG. 11.

(3) Securement of Reliability

In this embodiment, among the components of the reference compressor 15 having past records of design or production, those fulfilling the specifications required of the compressor 38 can be reused (i.e., diverted from the reference compressor 15 to the compressor 38). Therefore, in regard to such components diverted from the reference compressor 15, the reliability can be secured without the need of specially conducting verification or the like.

(4) Increase in Natural Frequency

In general, the natural frequency of the rotor can be increased by increasing the shaft diameter of the rotor. However, in the configuration illustrated in FIG. 3, increasing the shaft diameter of the rotor can lead to interference with the inner circumferential member 8.

In contrast, in this embodiment, along with the increase in the inner radii in the front stages, the outer circumferential surface 8a of the inner circumferential member 8 is raised in the radial direction, and thus the thickness (width in the radial direction) of the inner circumferential member 8 increases. Therefore, the bottom surface of the inner circumferential member 8 (surface facing the disk 2a) can be raised in the radial direction by a distance equal to the increment in the thickness. Accordingly, the natural frequency of the rotor can be increased by increasing the shaft diameter d7 of the rotor to d7' without causing the interference with the inner circumferential member 8. Consequently, the possibility of the occurrence of the rotor vibration problem decreases and the reliability of the compressor can be increased.

Second Embodiment

Configuration

Figure 12:
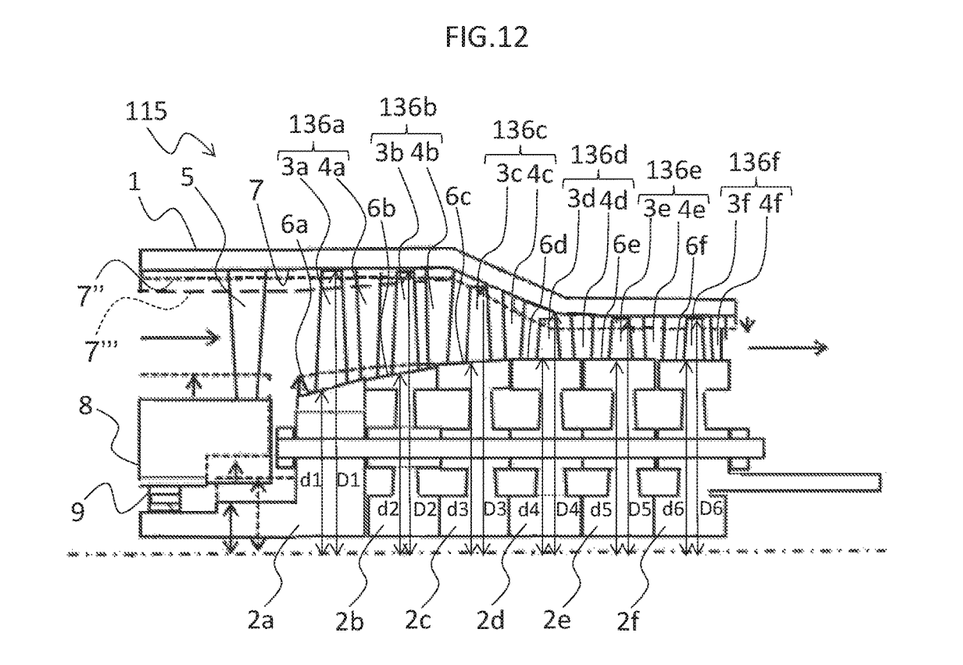
FIG. 12 is a schematic diagram showing the overall configuration of a configuration example of a reference compressor according to a second embodiment of the present invention.

FIG. 12 is a schematic diagram showing the overall configuration of a configuration example of a reference compressor according to a second embodiment of the present invention. Parts in FIG. 12 equivalent to those in the reference compressor 15 in the first embodiment are assigned the already used reference characters and repeated explanation thereof is omitted properly.

As shown in FIG. 12, the reference compressor 115 according to this embodiment differs from the reference compressor 15 in that the reference compressor 115 includes outer radius constant stages (an initial stage 136a and an intermediate stage 136b in FIG. 12) in which the reference outer radius is constant from the initial stage 136a toward the downstream side and an outer radius decreasing stage (an intermediate stage 136c in FIG. 12) which connects to the downstream side of the outer radius constant stages 136a and 136b and in which the reference outer radius decreases toward the downstream side. The rest of the configuration is equivalent to that in the reference compressor 15.

In this embodiment, the inner radius increments and the outer radius decrements in the outer radius constant stages 136a and 136b and the outer radius decreasing stage 136c of the reference compressor 115 are determined by adding conditions to the step S4 in the first embodiment. The other steps are equivalent to those in the first embodiment.

In this embodiment, the inner radius increments and the outer radius decrements in the outer radius constant stages 136a and 136b and the outer radius decreasing stage 136c are determined so as to satisfy the following relationships:

Outer Radius Constant Stages

In the outer radius constant stages 136a and 136b, the inner circumferential surface 7 is changed to the inner circumferential surface 7" by uniformly decreasing the reference outer radii D1 and D2 so that D1 and D2 become equal to the outer radius at a downstream end stage in the outer radius constant stages 136a and 136b in a case where only the reference outer radii D1 and D2 are decreased, while the reference inner radii d1 and d2 are increased according to the decrement in the reference outer radii D1 and D2 (i.e., so as to compensate for the decrease in the decrements in the annulus areas in the outer radius constant stages 136a and 136b caused by the uniform decreasing of the reference outer radii D1 and D2).

Outer Radius Decreasing Stage

In the outer radius decreasing stage 136c, the reference outer radius D3 is decreased so that decrements in the annulus areas of the reference compressor 115 with respect to the determined annulus areas become uniform.

Incidentally, while a case where only the tip cut is conducted in the outer radius decreasing stage 136c is illustrated in FIG. 12, it is also possible to conduct the hub up in addition to the tip cut when necessary.

Effect

With the above-described configuration, this embodiment achieves the following effect in addition to the aforementioned effects achieved in the first embodiment.

When the annulus areas of the reference compressor 115 are decreased by means of the tip cut, there are cases where the outer radius increases as it goes downstream in the outer radius constant stages 136a and 136b (i.e., the inner circumferential surface 7 becomes like the inner circumferential surface 7'''). In cases where the thrust load is borne by the shaft bearing 9, along with the thermal extension due to the gas turbine operation, the disks 2a-2f and the rotor blades 3a-3f move downstream (rightward in FIG. 12) with reference to the shaft bearing 9. Then, the clearance between the inner circumferential surface 7''' and the rotor blades 3a-3b enlarges and that can lead to a drop in the compressor efficiency.

In contrast, in this embodiment, the reference outer radii D1 and D2 are decreased uniformly in the outer radius constant stages 136a and 136b. Thus, even when the disks 2a-2f and the rotor blades 3a-3f move downstream, the clearance between the inner circumferential surface 7" and the rotor blades 3a-3b does not enlarge and the drop in the compressor efficiency can be inhibited.

Third Embodiment

Configuration

Figure 13:
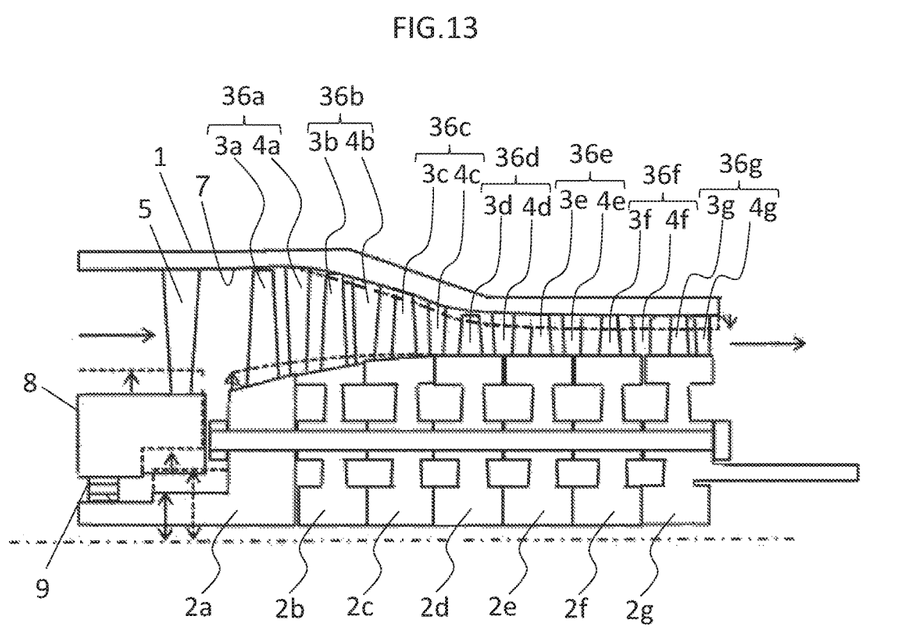
FIG. 13 is a schematic diagram showing the overall configuration of a configuration example of a reference compressor according to a third embodiment of the present invention.

FIG. 13 is a schematic diagram showing the overall configuration of a configuration example of a compressor according to a third embodiment of the present invention. Parts in FIG. 13 equivalent to those in the reference compressor 15 in the first embodiment are assigned the already used reference characters and repeated explanation thereof is omitted properly.

As shown in FIG. 13, this embodiment differs from the first embodiment in that a blade stage 36g including a disk 2g, a stator blade 4g and a rotor blade 3g is added to the downstream side of the final stage 36f of the compressor designed/produced based on the reference compressor 15. The rest of the configuration is equivalent to that in the first embodiment.

Effect

With the above-described configuration, this embodiment achieves the following effect in addition to the aforementioned effects achieved in the first embodiment.

When it is desirable to also change the compression ratio in addition to the reduction in the compressor flow rate, the purpose can be achieved by decreasing the compressor flow rate and then changing the number of blade stages. For example, the compression ratio can be raised by adding the blade stage 36g to the downstream side of the final stage 36f as in this embodiment. Incidentally, the compression ratio can be raised further by increasing the number of blade stages added. Conversely, it is also possible to lower the compression ratio by decreasing the number of blade stages.

Fourth Embodiment

Configuration

Figure 14:
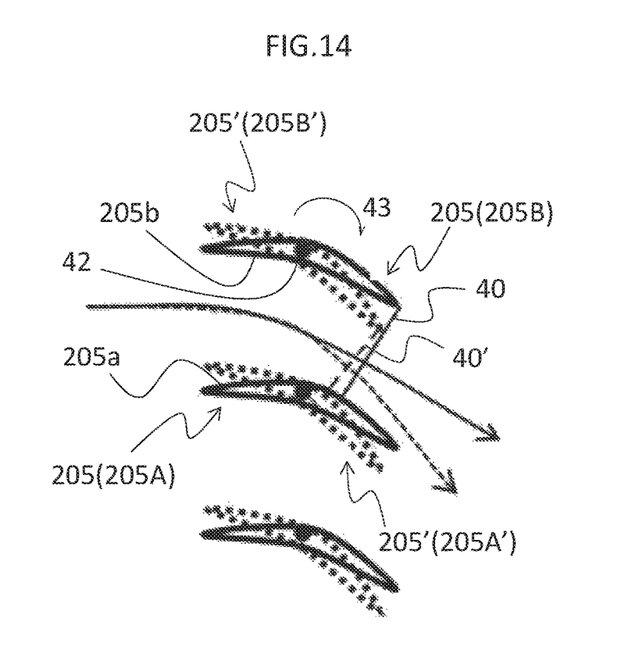
FIG. 14 is a schematic diagram showing a configuration example of inlet guide vanes according to a fourth embodiment of the present invention.

FIG. 14 is a schematic diagram showing a configuration example of inlet guide vanes according to a fourth embodiment of the present invention.

This embodiment differs from the reference compressor 15 in that the inlet guide vanes 5 are replaced with inlet guide vanes 205 (205A, 205B, etc.) shown in FIG. 14 each of which is rotatable around a shaft 42 as a rotary shaft extending in the blade length direction. The rest of the configuration is equivalent to that in the reference compressor 15.

The compressor flow rate is determined in proportion to the size of a throat 40. The throat 40 means the length of a line connecting a position on a vane back surface 205a of the inlet guide vane 205A and a position on a vane back surface 205b of the inlet guide vane 205B (adjoining the inlet guide vane 205A in the circumferential direction of the rotor) that minimize the distance between the vane back surfaces 205a and 205b. As shown in FIG. 14, by rotating the inlet guide vanes 205 around the rotary shafts 42 clockwise (in the direction of the arrow 43 in FIG. 14) into the inlet guide vanes 205' (205A', 205B', etc.), the throat 40 is changed to the throat 40'. Since the throat 40' is shorter than the throat 40, the compressor flow rate decreases. Conversely, if the inlet guide vanes 205 are rotated counterclockwise, the throat 40 becomes longer and thus the compressor flow rate increases. To sum up, the inlet guide vanes 205 have a compressor flow rate regulation function.

Effect

With the above-described configuration, this embodiment achieves the following effect in addition to the aforementioned effects achieved in the first embodiment.

In the first embodiment, greatly decreasing the annulus areas can lead to excessively low blade heights in blade stages on the downstream side, and consequently, to a significant drop in the compressor efficiency.

In this embodiment, in addition to the method of reducing the compressor flow rate by decreasing the annulus areas, it is also possible to reduce the compressor flow rate by rotating the inlet guide vanes 205. Thus, even when greatly decreasing the annulus areas is necessary, it is possible to rotate the inlet guide vanes 205, thereby reduce the compressor flow rate, and correspondingly reduce the decrease in the annulus areas. Accordingly, it is possible to inhibit a great decrease in the annulus areas and thereby avoid the excessively low blade heights and the significant drop in the compressor efficiency.

While a case where the rotatable inlet guide vanes 205 are provided instead of the inlet guide vanes 5 has been illustrated in this embodiment, it is also possible to reuse the inlet guide vanes 5 if the inlet guide vanes 5 have originally been configured to be rotatable. The above-described effect can be achieved also in this case.

Other Examples

The present invention is not restricted to the above-described embodiments but includes a variety of modifications. For example, the above embodiments, which have been described in detail for the purpose of easily understandable description of the present invention, are not necessarily restricted to those including the whole of the described configuration. For example, it is possible to replace part of the configuration of an embodiment with a configuration in another embodiment, or to delete part of the configuration of each embodiment.

In the above embodiments, cases where the inner radius increment is determined to be greater than the outer radius decrement in the initial stage 36a have been described as examples. However, the essential effect of the present invention is to provide design and production methods of a gas turbine capable of reducing the compressor flow rate in comparison with the reference model while maintaining a compression ratio equivalent to that in the reference model, and thus the present invention is not restricted to such cases as long as the essential effect is achieved. For example, the inner radius increment may also be determined to be equal to the outer radius decrement or less than the outer radius decrement in the initial stage 36a.

Further, while the casing 1 is formed of one sheet-like member in the above-described embodiments, the present invention is not restricted to such a configuration as long as the aforementioned essential effect of the present invention is achieved. For example, the casing 1 may also be formed by stacking a plurality of cylindrical separate members.

Furthermore, while examples of applying the present invention to a humid air gas turbine 200 have been described in the above embodiments, the present invention is widely applicable to gas turbines that employ the cycle of injecting steam into the combustor. The present invention is applicable also to blast furnace gas firing gas turbines and the like.

DESCRIPTION OF REFERENCE CHARACTERS 15, 115: Reference compressor
100: Reference gas turbine
200: Derivative gas turbine 32: Compressor channel
d1-d6: Reference inner radius
D1-D6: Reference outer radius
38: Compressor
36a, 136a: Initial stage
36b-36e: Intermediate stage
36f, 136f: Final stage
5, 205: Inlet guide vane

What is claimed is:

1. A gas turbine production method for producing a derivative gas turbine of a different cycle based on a reference gas turbine including a reference compressor, wherein:
letting a reference inner radius and a reference outer radius respectively represent an inner radius and an outer radius of an annular compressor channel of the reference compressor, an inner radius increment represent an increment in an inner radius of a compressor channel of the derivative gas turbine with respect to the reference inner radius, and an outer radius decrement represent a decrement in an outer radius of the compressor channel of the derivative gas turbine with respect to the reference outer radius, the gas turbine production method comprising the steps of:
determining a compressor flow rate and a compression ratio required of a compressor of the derivative gas turbine;
determining annulus areas required of the compressor of the derivative gas turbine based on the determined compressor flow rate and compression ratio;
determining the inner radius increment and the outer radius decrement of an initial stage, determining the inner radius increment and the outer radius decrement of each of intermediate stages on the downstream side of the initial stage such that the inner radius increment is not more than the inner radius increment of the previous stage and the outer radius decrement is not less than the outer radius decrement of the previous stage, and determining the inner radius increment and the outer radius decrement of a final stage on the downstream side of the intermediate stages such that the outer radius decrement is not less than the inner radius increment under a condition that the outer radius of the compressor channel is decreased, the inner radius of the compressor channel is increased, and the annulus area of each stage of the compressor of the derivative gas turbine becomes equal to the determined annulus area;
designing the compressor of the derivative gas turbine by updating design data of components of the reference compressor that deviated from specifications due to the determination of the inner radius increment and the outer radius decrement such that the updated design data fulfill the specifications in the initial stage, in each of the intermediate stages, and in the final stage; and
producing the compressor of the derivative gas turbine based on the design and thereby producing the derivative gas turbine.

2. The gas turbine production method according to claim 1, wherein the inner radius increment is determined to be greater than the outer radius decrement in the initial stage.

3. The gas turbine production method according to claim 1, wherein decrements in the annulus areas of the reference compressor with respect to the determined annulus areas are made uniform.

4. The gas turbine production method according to claim 1, wherein in each stage on the downstream side of the initial stage, a decrement in the annulus area of the reference compressor with respect to the determined annulus area is made greater than the decrement in the previous stage.

5. The gas turbine production method according to claim 1, wherein:
the reference compressor includes outer radius constant stages in which the reference outer radius is constant from the initial stage toward the downstream side and an outer radius decreasing stage that connects to the outer radius constant stages and in which the reference outer radius decreases toward the downstream side,
in the outer radius constant stages, the annulus area in each stage is made equal to the determined annulus area by uniformly decreasing the reference outer radii in the stages such that the reference outer radii become equal to the outer radius at a downstream end stage in the outer radius constant stages in a case where only the reference outer radii are decreased, while increasing the reference inner radii according to the decrement in the reference outer radii, and
in the outer radius decreasing stage, the reference outer radius is decreased such that decrements in the annulus areas of the reference compressor with respect to the determined annulus areas become uniform.

6. The gas turbine production method according to claim 1, wherein at least one stage is added to the downstream side of the final stage.

7. The gas turbine production method according to claim 1, wherein inlet guide vanes each of which rotates around a shaft extending in a blade length direction as a rotary shaft are provided on the upstream side of the initial stage.

8. A gas turbine design method for designing a derivative gas turbine of a different cycle based on a reference gas turbine including a reference compressor, wherein:
letting a reference inner radius and a reference outer radius respectively represent an inner radius and an outer radius of an annular compressor channel of the reference compressor, an inner radius increment represent an increment in an inner radius of a compressor channel of the derivative gas turbine with respect to the reference inner radius, and an outer radius decrement represent a decrement in an outer radius of the compressor channel of the derivative gas turbine with respect to the reference outer radius, the gas turbine design method comprising the steps of:
determining a compressor flow rate and a compression ratio required of a compressor of the derivative gas turbine;
determining annulus areas required of the compressor of the derivative gas turbine based on the determined compressor flow rate and compression ratio;
determining the inner radius increment and the outer radius decrement of an initial stage, determining the inner radius increment and the outer radius decrement of each of intermediate stages on the downstream side of the initial stage such that the inner radius increment is not more than the inner radius increment of the previous stage and the outer radius decrement is not less than the outer radius decrement of the previous stage, and determining the inner radius increment and the outer radius decrement of a final stage on the downstream side of the intermediate stages such that the outer radius decrement is not less than the inner radius increment under a condition that the outer radius of the compressor channel is decreased, the inner radius of the compressor channel is increased, and the annulus area of each stage of the compressor of the derivative gas turbine becomes equal to the determined annulus area; and designing the compressor of the derivative gas turbine by updating design data of components of the reference compressor that deviated from specifications due to the determination of the inner radius increment and the outer radius decrement such that the updated design data fulfill the specifications in the initial stage, in each of the intermediate stages, and in the final stage, and thereby designing the derivative gas turbine.

9. A gas turbine production method for producing a derivative gas turbine of a different cycle based on a reference gas turbine including a reference compressor, wherein:

letting a reference inner radius and a reference outer radius respectively represent an inner radius and an outer radius of an annular compressor channel of the reference compressor, an inner radius increment represent an increment in an inner radius of a compressor channel of the derivative gas turbine with respect to the reference inner radius, and an outer radius decrement represent a decrement in an outer radius of the compressor channel of the derivative gas turbine with respect to the reference outer radius, the gas turbine production method comprising the steps of:

determining a compressor flow rate and a compression ratio required of a compressor of the derivative gas turbine;

determining annulus areas required of the compressor of the derivative gas turbine based on the determined compressor flow rate and compression ratio;

determining the inner radius increment and the outer radius decrement of an initial stage, determining the inner radius increment and the outer radius decrement of each of intermediate stages on the downstream side of the initial stage such that the inner radius increment is not more than the inner radius increment of the previous stage and the outer radius decrement is not less than the outer radius decrement of the previous stage, and determining the inner radius increment and the outer radius decrement of a final stage on the downstream side of the intermediate stages such that the outer radius decrement is not less than the inner radius increment under a condition that the annulus area of each stage of the compressor of the derivative gas turbine becomes equal to the determined annulus area;

designing the compressor of the derivative gas turbine by updating design data of components of the reference compressor that deviated from specifications due to the determination of the inner radius increment and the outer radius decrement such that the updated design data fulfill the specifications in the initial stage, in each of the intermediate stages, and in the final stage; and producing the compressor of the derivative gas turbine based on the design and thereby producing the derivative gas turbine, wherein:

the reference compressor includes outer radius constant stages in which the reference outer radius is constant from the initial stage toward the downstream side and an outer radius decreasing stage that connects to the outer radius constant stages and in which the reference outer radius decreases toward the downstream side, in the outer radius constant stages, the annulus area in each stage is made equal to the determined annulus area by uniformly decreasing the reference outer radii in the stages such that the reference outer radii become equal to the outer radius at a downstream end stage in the outer radius constant stages in a case where only the reference outer radii are decreased, while increasing the reference inner radii according to the decrement in the reference outer radii, and in the outer radius decreasing stage, the reference outer radius is decreased such that decrements in the annulus areas of the reference compressor with respect to the determined annulus areas become uniform.

\* \* \* \* \*